INVENTORS.
LOUIS SHAPIRO
HERBERT A. ELION
BY
*Millman and Jacobs*
ATTORNEY.

INVENTORS.
LOUIS SHAPIRO
HERBERT A. ELION
BY
ATTORNEY

United States Patent Office 3,307,066
Patented Feb. 28, 1967

3,307,066
AFOCAL-BEAM PROBE SYSTEM AND APPARATUS
Louis Shapiro, Cherry Hill, and Herbert A. Elion, Princeton, N.J., assignors, by mesne assignments, to The First Pennsylvania Banking and Trust Company, trustee
Continuation of application Ser. No. 123,065, July 10, 1961. This application Dec. 21, 1964, Ser. No. 420,030
17 Claims. (Cl. 315—24)

This is a continuation of our copending patent application "Beam Probe System and Apparatus," Ser. No. 123,065, Filed July 10, 1961, now U.S. Patent No. 3,223,837.

This invention relates to a beam probe system and apparatus incorporating a deflection system for scanning purposes.

In my copending patent application, "Electron Probe System", filed March 2, 1961, Ser. No. 92,889, now U.S. Patent No. 3,235,727, an electron beam probe system is described which is especially adapted for X-ray microanalysis. With this system a specimen is irradiated in a microscopic area by means of a beam of electrons to stimulate the emission of X-rays. The emitted X-rays are analyzed by means of a spectrometer in order to determine the characteristics of the specimen from which they were emitted. With the techniques of electron optics the electron beam can be directed as a stationary probe to an area of one micron and less, and can be deflected to analyze minutely the variations in composition occurring from point to point in a specimen. By electronic deflection of the electron beam, scanning techniques are made available to display an image of the X-ray emission over a substantial area of the specimen. In addition, the scanning techniques permit the development of an electron display image as in scanning electron microscopy at the same time that the X-ray image is being developed.

In a deflection system involving a focused beam of charged particles, the surface swept out by the deflected beam focal point thereof is seldom a plane. Very often the actual target is substantially a plane, however, so that the beam spot would tend to go out of focus as it sweeps across the target. Also in such systems, there is a problem of depth of focus when working with a specimen that has a topographical character to be examined. That is, it may be very important to obtain information about the hills and dales that exist in a mineralogical specimen like a meteorite or in a biological specimen. The difficulties in dealing with such problems of depth of focus become almost insurmountable when they occur in a scanning system. Unless the spot is accurately focused on the target, the diameter of the spot which is used for obtaining measurement signals is not clearly defined, and the derived data is correspondingly difficult to interpret.

In the microanalyzer, there is a need for a long working distance between the electron optics and the specimen in order to attain optimum results in the measurements with the X-ray optics and the back scattered electrons. With certain systems that have been developed it has been necessary to arrange the deflection system within the electron optics itself. This has the effect of complicating the optical design, limiting the angle of deflection, as well as the linearity of the deflection system, and adversely affecting the repeatability of the deflection operation.

Accordingly, it is an object of this invention to provide a new and improved probe apparatus having a beam of charged particles.

Another object is to provide a new and improved apparatus for X-ray microanalysis.

Another object is to provide a new and improved scanning electron beam probe apparatus.

In an embodiment of this invention, beam probe apparatus having an electronic deflection system is arranged with an afocal beam-forming arrangement. The deflection system is arranged to be external to the beam-forming apparatus. The beam probe is a beam of charged particles of generally circular cross section and collimated to be substantially cylindrical when supplied to the deflection mechanism. The electronic deflection mechanism is essentially decoupled from the beam-forming apparatus so that a large working distance can be provided.

This invention has application in various arrangements utilizing a beam of charged particles to be deflected over an area.

The foregoing and other objects of this invention, the features thereof as well as the invention itself, may be more fully understood from the following description when read together with the accompanying drawing, in which.

In the drawing corresponding parts are referenced by similar numerals throughout.

Figure 1:
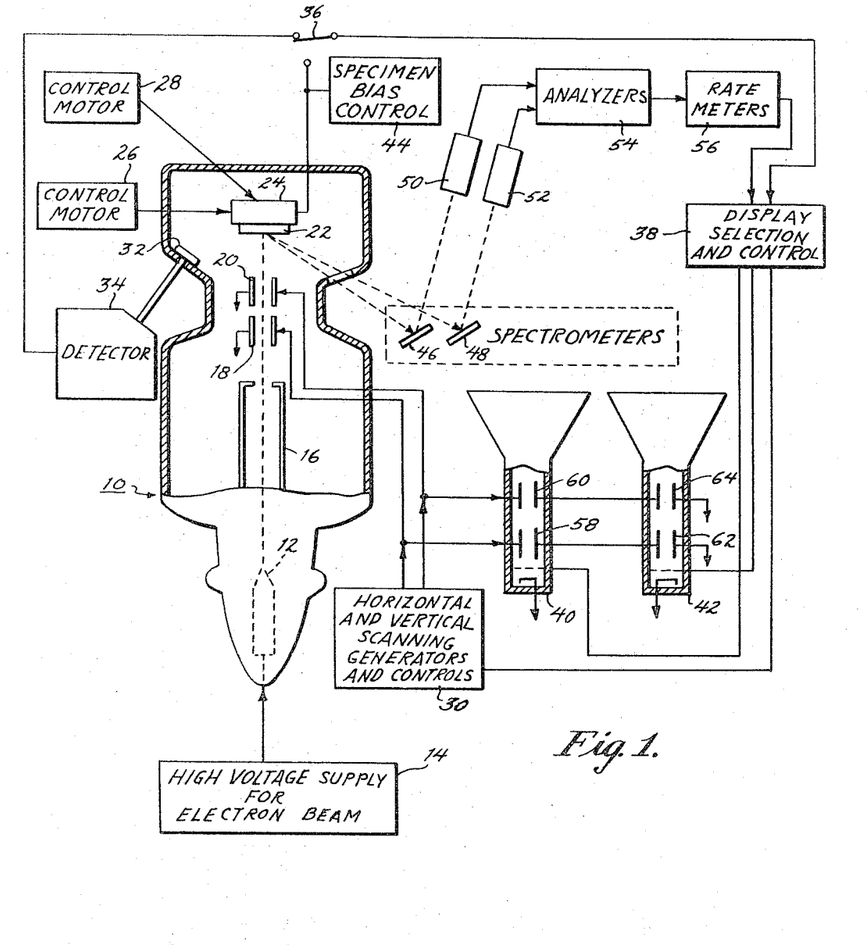
FIG. 1 is a schematic and block diagram of an electron probe system in a microanalyzer embodying this invention.

In FIG. 1 a generalized block diagram of the scanning system of this invention is shown. The electron probe is formed as an electron beam in a column 10 that is oriented vertically. The beam is emitted from a filament 12 which is energized by a suitable adjustable high voltage supply 14 adapted to supply a maximum of about 50 kilovolts. The electron beam is formed by electron optics 16 described hereinafter. The electron beam passes through two sets of deflection plates 18 and 20 which respectively deflect the beam in transverse directions. The beam is directed to a specimen 22 supported on a specimen stage 24 which is adapted to be moved in transverse directions by separate control motors 26 and 28. The stage 24 is also adapted to be moved axially along the column 10 by another control motor (not shown).

The deflection plates 18 and 20 are separately energized by horizontal and vertical scanning generators shown generally by the block 30. The scanning raster may be of the order of two millimeters square, and the specimen may be many times that in area. The control motors 26 and 28 move the specimen 22 to different positions so that different areas of that specimen may be scanned by the electron beam.

High velocity electrons reflected from the specimen 22 are directed to a phosphor element 32 at the side of the column, and the light emitted from the phosphor is directed to a detector 34 which may be a photo multiplier. The electrical signal derived as an output from the detector 34 is characteristic of an electron image of the specimen 22, and this output is supplied via a switch 36 and a control system 38 to one or the other of two display tubes 40 and 42. A voltage bias may be applied to the specimen 22 by a bias control 44, and the specimen current may be used as a specimen image signal that may be selectively displayed via switch 36 and the control 38 on the display tubes 40 and 42.

Some of the electrons irradiating the specimen 22 penetrate that specimen and excite the emission of X-rays. These X-rays are directed to spectrometer crystals 46 and 48 and reflected to separate detectors 50 and 52, such as scintillation or Geiger-Muller counters. The outputs of the detectors 50 and 52 may be in the form of pulses and are supplied to scalers or analyzers 54 (such as pulse height analyzers), the outputs of which are transmitted via rate meters 56 to the control 38 for selecting the display on the tubes 40 and 42. Suitable arrangements for deriving appropriate electrical signals from the X-ray emission are well known. Pen recorders (not shown) may be provided for charting these signals in addition to using them in the image display of tubes 40 and 42.

The display tubes 40 and 42 have deflection systems 58, 60 and 62, 64 which are deflected in synchronism with each other and with the deflection plates 18 and 20 of the column 10 by the scanning generators 30. The terms "horizontal" and "vertical" are used to refer conveniently to the usual orientations of the scanning in a display tube; but no restriction as to actual positions of use is intended thereby.

In operation, electron images of the specimen being scanned are provided by the reflected electron currents and by the specimen currents, one of which may be selected by the switch 36. In addition, an X-ray image of the specimen is represented by signals from the spectrometers 46 and 48 and the detectors 50 and 52. These various image signals may be selected via the control 38 and displayed by intensity modulation of the display tubes 40 and 42 via their grids. For example, one of the tubes may display an electron image and the other, an X-ray image, or different kinds of X-ray images may be displayed by the two tubes 40 and 42. Various other arrangements for displaying information about the specimen 22 are set forth in the aforementioned copending application. For example, the signals to be displayed may be applied via a connection to the scanning generator control 30 for deflection of the display tube beam. Thereby, deflection of its beam is proportional to the signals applied so that one or the other of the display tubes 40, 42 may be used to indicate such measurements of the characteristics of the specimen 22 as well as the images thereof.

Figure 2:
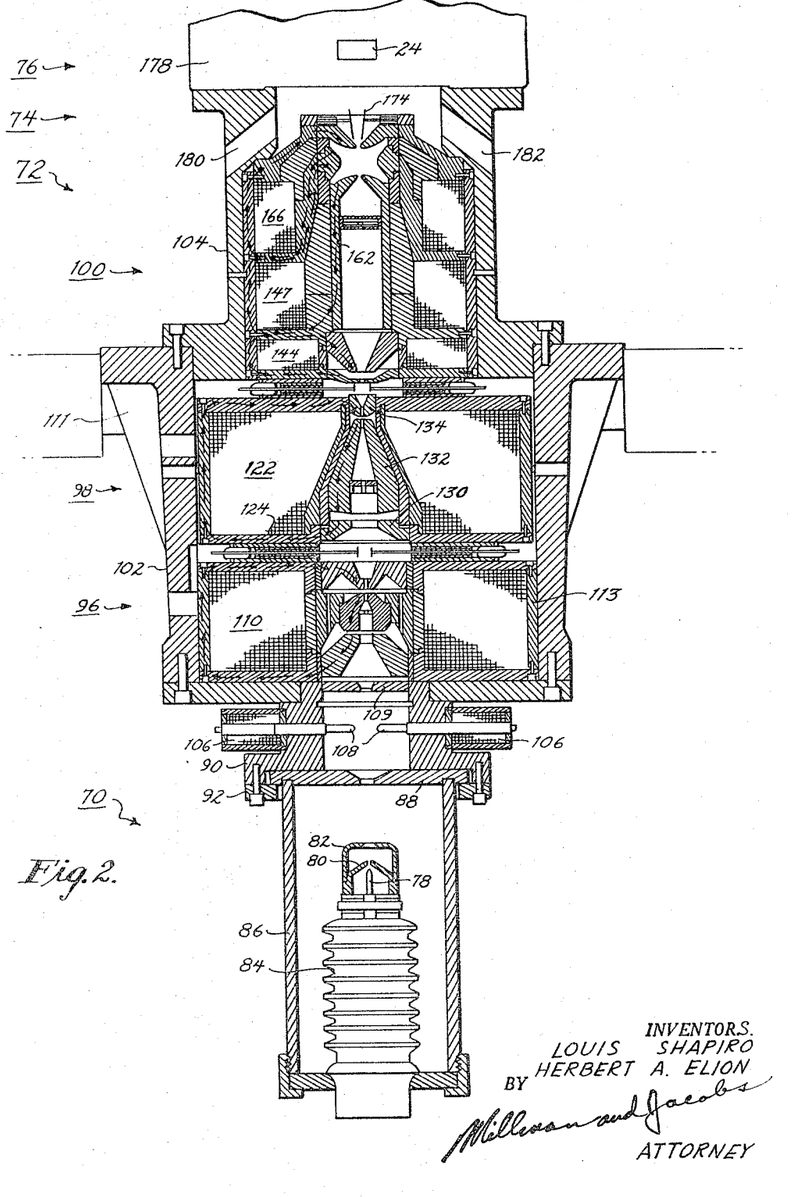
FIG. 2 is a sectional view in elevation of a beam column having a deflection system for use in the system of FIG. 1.

The beam probe and scanning system is shown in FIG. 2, and it includes the electron gun and source 70, the beam-forming apparatus 72, the scanning mechanism 74, and the specimen stage and associated mechanism 76.

The electron gun 70 includes a thermionic electron source such as a tungsten filament 78 enclosed within a grid cap structure of two parts 80 and 82, which are apertured suitably to pass the electron beam from the filament. The grid cap parts 80 and 82 are at the same potential, varying substantially around a middle-valued voltge of —250 volts with respect to the filament 78. The filament 78 operates to a —50,000 volt level and may be heated by radio frequency heating operating at about 80 kilocycles. The gun 70 may also be non-thermionic, for example, with cold cathode emission. The filament 78 is mounted on an insulator 84 which is supported by a casing 86 electrically connected to an apertured plate 88 that is utilized as the grounded anode of the gun 70. The aperture in the anode plate 88 is aligned with the apertures in the grid cap 80 and 82. The anode plate 88 and casing attached thereto are mounted on a flanged cylindrical housing 90 by means of an annular ring 92 that slidably engages the undersurface of the anode plate 88. The screws for the annular clamping ring 92 are so adjusted as to allow a lateral adjustment screw 94 (FIG. 3) to move the electron gun 70 for alignment with the remainder of the structure.

The beam-forming structure 72 includes three pairs of beam formers 96, 98, and 100; the term "beam formers" is used in preference to "electron lenses," the latter being often used for related structures, because the beam is not focused. The first two pairs of beam formers 96 and 98 are mounted in a cylindrical casing 102, and the pair 100 is mounted in a cylindrical casing 104 attached to the casing 102. The casing 102 is attached to the upper portion of the cylindrical housing 90. The latter contains gun-tilt coils 106 and associated pole pieces 108 that are used to tilt the electron beam passing between them to insure that the beam stays on its proper axis. These coils provide a fine adjustment by varying the energization thereof. A second set of gun-tilt pole pieces and coils (not shown) are positioned transverse to the pole pieces 108 to provide full adjustment of the beam in all directions at that point of its axis. An apertured heat shield 109 separates the housing 90 from the beam-forming structure.

The housing 102 is flanged at its upper portion for suspending the overall column on a suitable support 111. The flanged cylindrical housing 90 is attached to the mounting housing 102 as is the housing 104. Thereby, the overall supporting structure is provided.

In the lower portion of the housing 102, the first pair of beam formers 96 is mounted together with its associated coil 110. The annular coil 110 is mounted within an annular magnetic shell 113, and has three pole pieces 112, 114, and 116 associated with it that are mounted within the central portion of the annular shell 113 to provide the desired beam-forming properties. The pole pieces 112, 114, and 116 are cylindrically symmetrical; that is, each of these pole pieces may be considered as having a circular cross section at any point along the axis. The beam-forming pole pieces 112 and 116 are respectively in magnetic circuit with the upper and lower portions of the annular magnetic shell 113. The intermediate pole piece 114 is in magnetic circuit with the other pole pieces 112 and 116 and spaced therefrom in order to provide appropriate magnetic fields at the spaced pole faces. An apertured washer 118 in the pole piece 114 is positioned as a stop approximately at the focal point of the first beam former or lens developed at the gap between the pole pieces 112 and 114. The intermediate pole piece 114 is mounted within a non-magnetic support 120 that breaks the continuity of the central inside portion of the annular shell 113 of the coil 110 to assure the proper magnetic circuit via the beam-forming pole pieces 112, 114, 116.

Figure 3:
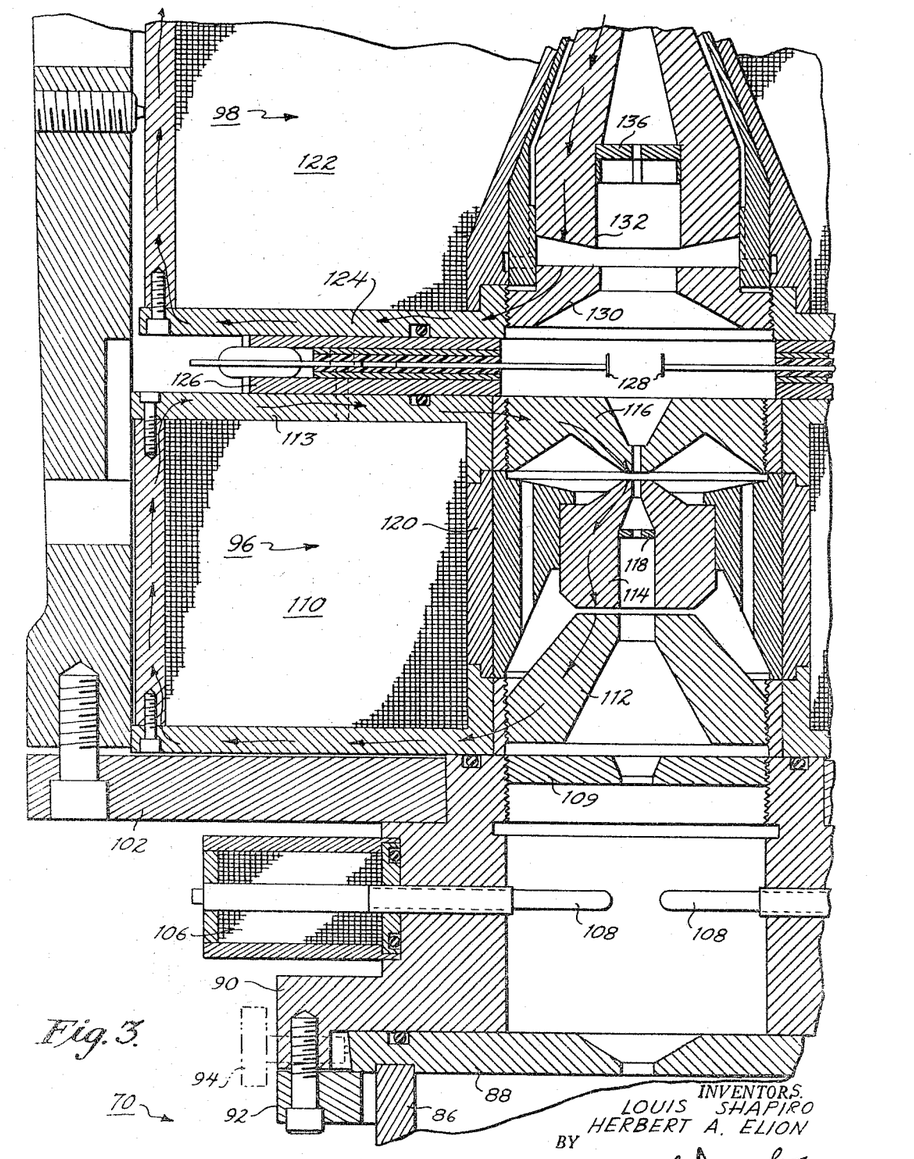
FIG. 3 is an enlarged sectional view in elevation of the first three beam-forming elements in the beam column of FIG. 2.

The coil 122 has an annular magnetic shell 124 that is spaced from the shell 113 for the coil 110. This spacing is provided by a non-magnetic support 126 for a set of condenser tilt alignment plates 128 (FIG. 3). Two transverse sets of such alignment plates 128 are provided and have appropriate alignment voltages applied thereto which may be adjusted to adjust the alignment of the beam passing therebetween in a manner similar to that described above for the gun-tilt pole pieces 108. Three pole pieces 130, 132, 134 (FIG. 4) are suitably mounted within the central portion of the annular shell 124. A washer 136 acts as a stop and is positioned within the intermediate pole piece 132 with its aperture aligned with the apertures of the other pole pieces.

Figure 4:
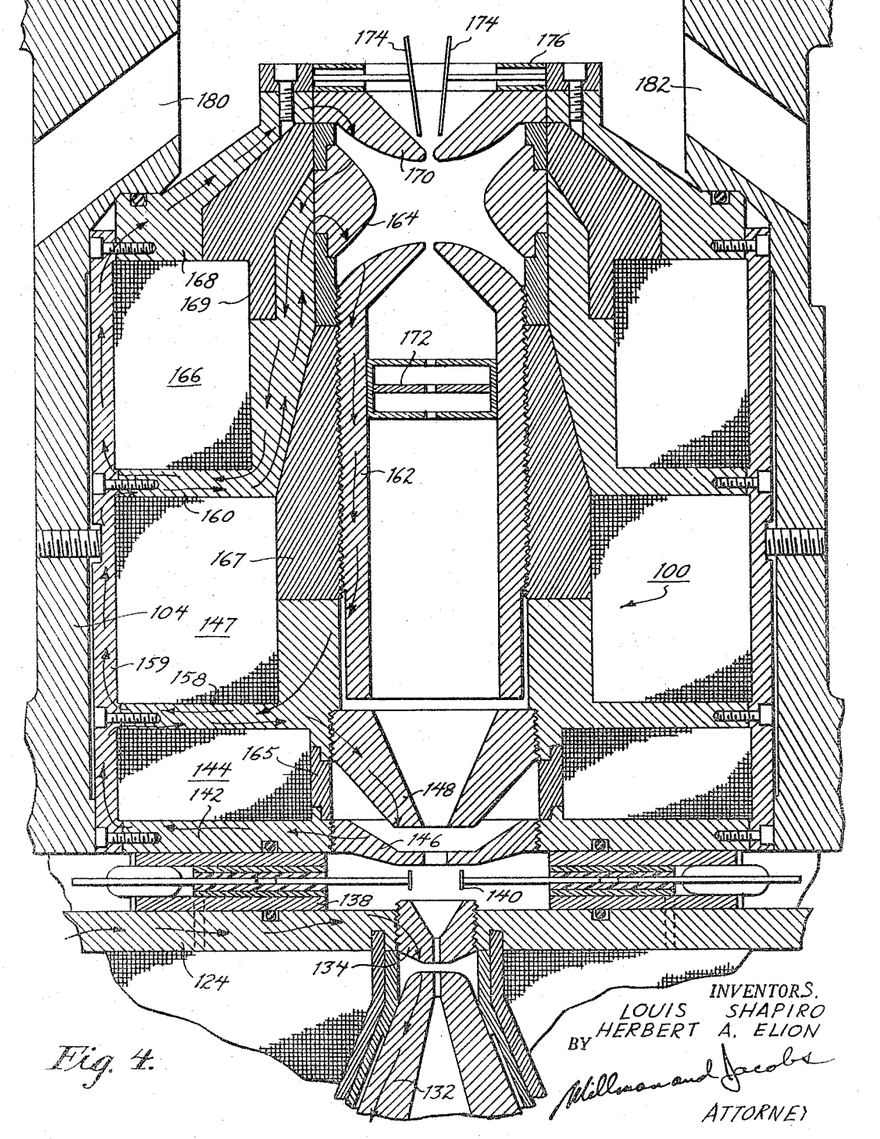
FIG. 4 is a cross sectional view in elevation of the last three beam-forming elements in the beam column of FIG. 2.

A non-magnetic support 138 for a set of intermediate alignment plates 140 is positioned between the magnetic shell 124 and a magnetic annular plate 142 that is used as part of the magnetic circuit for an annular coil 144. Two pole pieces 146 and 148 are associated with the coil 144 in the surrounding magnetic circuit made up of another annular plate 158 and a cylindrical shell 159. Another annular coil 147 is enclosed by the annular plate 158, and the annular member 160 together with the cylinder 159, arranged to form a shell for the pole pieces 162 and 164. The annular coil 166 is enclosed by the annular members 160 and 168 and cylinder 159 that form a shell for the pole pieces 164 and 170. Suitable non-magnetic spacers 165, 167, and 169 insure proper magnetic circuits through the pole pieces 146, 148, 162, 164, and 170. A stigmator 172 is positioned within the pole piece 162 and also includes a stop therein.

Figure 5:
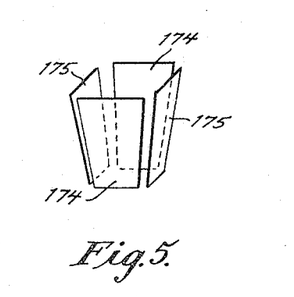
FIG. 5 is a simplified perspective view of a deflection plate arrangement used in FIG. 4.
Figure 6:
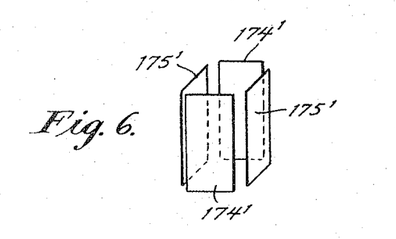
FIG. 6 is a perspective view of a modified arrangement of deflection plates.

The upper pole piece 170 is dished in its upper surface to receive a set of deflection plates 174 supported by a suitable insulating and non-magnetic support 176. A second pair of such deflection plates 175 (FIG. 5) is located at the same axial position as the plates 174 and positioned generally in the same way except that they are transverse to the plates 174 in the usual deflection system scheme. These deflection plates 174, 175 may be positioned to be diverging upwards so as to form an inverted truncated pyramid (FIG. 5); or they may be arranged parallel to the axis to form a box configuration of plates 174', 175', (FIG. 6).

Passageways are provided in various structural elements so that access may be had to the interstices for complete evacuation.

The housing 178 for the movable stage 24 is mounted on top of the cylindrical housing 104 for the upper beam-forming lenses. The stage 24 is spaced a substantial "working" distance from the deflection plates 174, which working distance is discussed in some detail hereinafter. Openings 180 and 182 are formed through the housing 104 at suitable angles; these inclined openings 180 and 182 are used for the passage of X-rays generated in a specimen on the stage 24 or for the detection of back scattered and reflected electrons as described above in connection with FIG. 1. Appropriate dimensions for the structure considered together with the available working distance permits a very large angle of inclination of these apertures 180 and 182, for example, of the order of 37°.

In the electron gun 70, the grid cap 80 and 82 forms a bias-dependent electrostatic lens which is effective for collimating the electron trajectories emitted from the filament 78. The region between the grid cap 82 and anode plate 88 may be considered a "source" for the purpose of any analysis of the beam trajectories involved. The collimated beam diameter is of the order of 400–500 microns.

Figure 7:
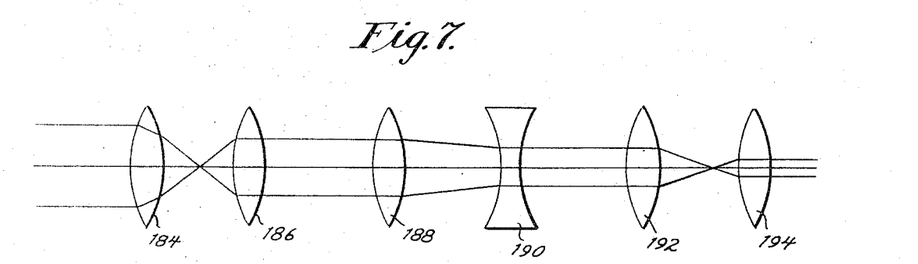
FIG. 7 is an idealized optical diagram representing an optical analogy of the beam-forming system of FIG. 2.
Figure 8:
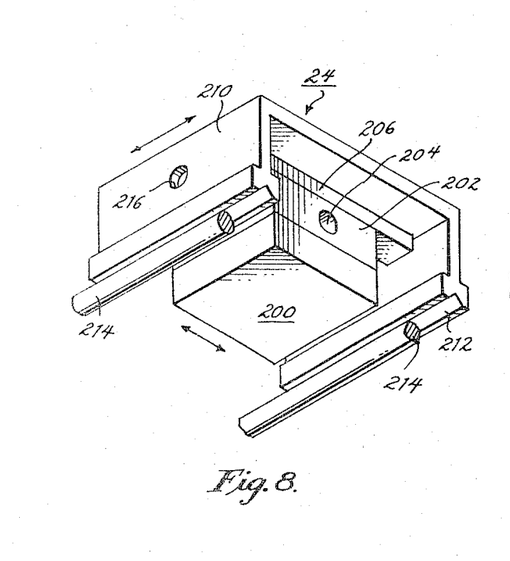
FIG. 8 is a perspective view of a specimen stage usable with the beam column of FIG. 2.

The effective operation of the beam-forming structure 72 is analogized for purposes of explanation to the light optics that might be provided by a set of lenses or beam formers such as those shown in FIG. 7. The pole pieces 112, 114, and 116 at the two gaps therebetween constitute the beam formers 96 which are excited by the same coil 110. This pair of beam formers constitutes the first cross-over of the system which occurs at the back telecentric stop 118. The beam formers 96 are a weak-to-strong couple with second stop immersion (that is, the effective cross-over due to the second beam former is inside the field of that second beam former). This arrangement has two functions: that of compression of the diameter of the beam, and the elimination of non-collimated electrons from the succeeding portion of the system.

In FIG. 7 an analogy to the beam formers 96 is indicated; namely, two convex lenses 184 and 186 receiving a collimated beam of light with a cross-over therebetween to provide a collimated beam of reduced diameter.

The second beam-forming pair 98 is also excited from a single coil 122. They include spherical electronic lenses with a telecentric stop 136 within the middle pole piece 132. This pair of beam formers is also a weak-to-strong couple but with no immersion and offers further compression. The optical analogy is suggested by the lenses 188 and 190, with the latter being a concave lens to represent the condition of the common focal point being beyond the latter lens, and to represent the corresponding divergence.

In the third pair of beam formers 100, independent excitation is provided by the coils 144, 147, and 166 for the pairs of pole pieces. The fifth beam former formed by the pole pieces 146 and 148 sets up the beam for final transfer and compression by the sixth beam former which comprises the pole pieces 162, 164, and 170. This sixth beam former is a hyperbolic lens used to correct various aberrations appearing in the final beam as it emerges from the beam-forming structure to ensure the proper shape of beam cross section. This hyperbolic lens also provides the final amount of compression so that the emerging beam is of the proper working cross section, collimated (that is, vanishingly convergent) and useful in its required cross section to approximately five inches beyond the upper bore of the hyperbolic lens.

The hyperbolic lens formed by the pole pieces 162, 164, and 170 may be replaced by a suitable spherical lens which is the type used for the other five lenses. The hyperbolic lens has certain advantages as a beam-former. That is, there is no aberration within the field of a hyperbolic lens as contrasted to a spherical lens. A hyperbolic field develops force, components of which are functions only of their own coordinates; thus, there is no radial distortion, which is not the case with the spherical lens. In other words, a beam of broad extension can be brought to a point focus, and the lens is free from aperture defect which is not the case for a spherical lens even with a uniform parallel beam. The hyperbolic aberration figure is less by an order of magnitude than would be the spherical aberration figure for a spherical lens replacement for the hyperbolic lens.

The hyperbolic lens as a unit is capable of a large number of modes of operation depending upon the transmission constant and the excitation parameter; this feature makes it especially useful in an afocal system where the final cross-over due to compression by the preceding spherical lens is at the position of the stigmator 172 and the front focal plane of the output lens. The final cross-over system due to compression by the preceding spherical lens is at the position of the stigmator 172 and the front focal plane of the output lens. The output lens picks up the beam at the circle of least confusion near the cross-over and transfers the beam to the final configuration suitable for deflection. A spherical lens would not be so effective because of aberrations and due to zonal imaging (that is, halos).

The behavior of a hyperbolic lens is more precisely predictable and controllable from given iron factors and machining tolerances compared to the behavior of a comparable spherical lens. Thus, the actual design of a hyperbolic lens approaches its theoretical ideal more reliably in actual performance. The hyperbolic lens generally removes the effect of iron non-uniformity from the beam, and it holds close tolerances over large boundary areas: whereas, in a spherical lens both the iron and geometry tend to have a greater effect on the beam and tend to maximize the effect of departures of uniformity.

The chromatic aberration associated with the hyperbolic lens can be minimized by insuring that incident electrons have the same velocities. This is attained in large measure by appropriate regulation of the high voltage supply.

Figure 9:
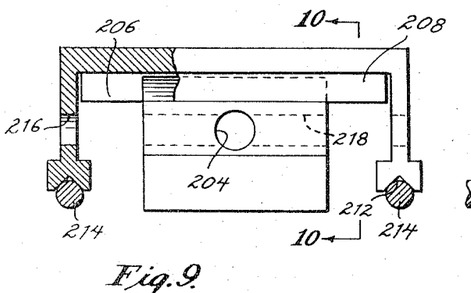
FIG. 9 is a side view in elevation and partly in section of the specimen stage of FIG. 2.
Figure 10:
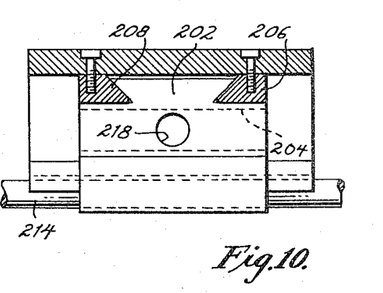
FIG. 10 is a sectional view taken on the line 10—10 of FIG. 9.
Figure 11:
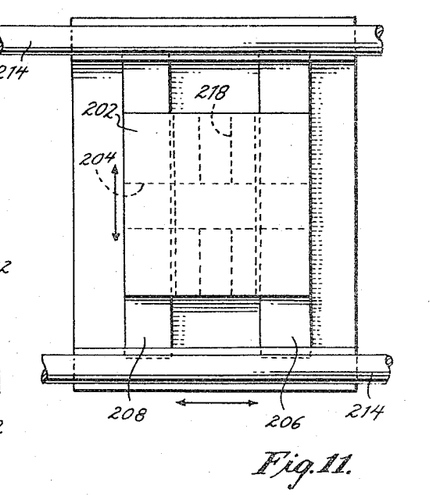
FIG. 11 is a plan view of the underside of the specimen carriage of FIG. 8.

The optical analogy in simplified form to the beam-forming of the hyperbolic lens is represented by the lenses 192 and 194 (FIG. 9) in which there is a cross-over therebetween, and the final collimated beam of reduced diameter emerges therefrom. The compression of the beam illustrated in FIG. 9 is not intended to be representative of the actual compression in the overall system. In practice, the aperture in the grid cap 82 may be of the order of hundreds of microns in diameter, and the compression by each of the beam formers may be about 10 to 20 to provide an overall compression of thousands and a final beam diameter of a fraction of a micron, such as 0.1 micron.

It will be seen from the above description that the concept of this beam probe is that of compressing a given number of charged particles (electrons) per unit time into a given area of deflecting beam cross section; it does not have the function of forming an image. Thus, this beam probe column is not "optical" except as it is convenient to consider it so by analogy, and only to the extent that the beam formers (that is to say, the magnetic field elements which determine the trajectory of the charged particles) are easily and often described as lenses. Thus, the beam-forming elements 72 of the probe column may be considered in some respects as an extension of the electron gun for forming the beam diameter; that is, the entire structure may be considered an electron gun since there is no imaging action. Thus, this beam-forming system is an iteratively compressive electromagnetic electron gun. This beam-forming system may be analogized for purposes of explanation to a simple telescope where optically as a light system, the eye is the "target" for the light "probe" in which an image is focused. The analogy of the telescope is helpful to the extent that there, too, the effective diameter of the beam of light is reduced; actually, the effect of magnification is due to the angular magnification as seen by the eye, which is actually the reciprocal of the linear magnification.

However, the analogy is not really effective to describe the beam probe, because the probe target is only concerned with the electrons hitting it in a certain area, and is not concerned with the ultimate source of those electrons nor with an image of that source. Thus, the beam formers merely manipulate the beam and its diameter, and the overall system is an afocal one. The manipulation of the beam formers serves to concentrate the electron beam supplied by the gun into an extremely small diameter with the electron movement essentially parallel to the axis of the beam.

In this afocal scanning beam system a working distance of about four to five inches has been provided which is approximately the distance from the effective principal plane of the final beam former to the most distant point where the beam retains its basic design parameter of a certain cross section diameter and configuration.

In this system, the deflection plates 174, 175 are positioned very near the principal plane of the final lens so that there is a distance of about 3.5 to 4.5 inches between the deflection mechanism and the specimen mounted on the stage 24. The area of deflection over the specimen is the order of 2 millimeters (about 0.08 inch square) so that the maximum deflection angle of the beam from its axis is only about 1°. In terms of the cosine of this angle, there would be an effective change in the effective cross section of the beam of only about two parts in 10,000. Thereby, the distortion due to the scanning is effectively minimized. There is no problem of keeping the beam in focus as such since the system is an afocal one; and the problems of depth of focus are essentially avoided. Thereby the topological character of a specimen may be examined accurately during scanning.

Another consideration in connection with the working distance is the need for as long a working distance as possible for optimum results with the X-ray optics. In this system the take-off angle for the X-rays is about 37° from the specimen plane which has been found to be extremely good. This large angle is obtained with a simple deflection system which neither complicates nor is complicated by the beam-forming system.

In FIGS. 8–11 the specimen stage 24 is illustrated. The specimen is mounted on the plane undersurface of a rectangular block 200 which is mounted on a dovetailed slide 202 having a feed-screw opening 204 therethrough. The dovetailed slide 202 moves within dovetailed guides 206 and 208 attached to an inverted U-shaped support 210 having V-shaped grooves 212 in the outer surfaces of the arms thereof. The grooves 212 are guided on cylindrical rods 214 which are oriented transversely to the dovetail guides 206 and 208 so that the movement of the specimen block 200 is transverse to the U-shaped support 210. The support 210 has an opening 216 for passing a feed-screw (not shown) into a feed-screw opening 218 in the slide 202 which is transverse to the opening 204. With this arrangement, the feed-screw connection to the opening 204 moves the support 210 and the specimen block 200 together with it along the guide rods 214. The feed-screw connection to the opening 218 in the slide 202 moves the slide along the dovetail guides 206 and 208 to position the block 200 in a transverse direction. Appropriate feed-screw arrangements for accommodating these movements are known in the art and do not form a part of this invention as such.

With this construction of the specimen stage, different portions of the specimen may be positioned to coincide with the deflection area of the electron beam probe. Thereby, a relatively large specimen may be mounted on the block 200 and different portions successively brought into position for scanning with the beam by means of the available movements of the block 200. The control motors 26 and 28 position the specimen block 200 via the feed-screw connections (not shown) so that successive areas of the specimen are made to coincide with the deflection area and accessible to the scanning beam. The beam deflection system provides an accurate positioning of the beam at any desired microscopic point with the deflection area.

The arrangement of an afocal beam former together with a deflection system mounted essentially externally outside of the beam former permits a simpler construction of the beam former and deflection mechanism. The deflection is more linear and has a higher degree of repeatability. That is, the same beam deflection is produced for a given deflection signal that is repeatedly applied. Moreover, the deflection is not materially affected by variations in the beam intensity so that such variations can be utilized in various applications of this apparatus. The beam is essentially formed with the desired cross-sectional configuration and decreased diameter and concentration of electrons before it is deflected. The deflection does not materially affect the size and shape of the beam cross section.

As is described in the aforementioned copending patent application, the scanning generators and controls 30 supply deflection signals for deflecting the beam transversely from its axis over an area of the specimen 22. These deflection signals may be continuously varying signals, or they may be constant-valued signals for deflecting the beam to any stationary position within the deflection area. This deflection system is extremely accurate so that the beam may be positioned to an accuracy of the same order as the beam diameter.

With this system and apparatus, the beam probe may be used as a fine scalpel and drill where cutting and shaping of material to a very fine degree of detail and precision is desired. The vertical and horizontal deflection signals may be constant-valued to drill a hole or holes at any desired point or points on a stage-mounted specimen. One of these deflection signals may be a linear sawtooth (or both may be a linear sawtooth) to cut a line. The thickness of such a line or the diameter of such a hole would be essentially related to the diameter of the beam, which may be as small as a fraction of a micron. Thereby, filters, gratings, and similar devices may be fabricated that would be useful in high-energy radiation. The deflection signals may be functions, mathematical or other, of any desired complexity, supplied by suitable generators for cutting out any desired pattern.

This ability to position and form a microbeam accurately is useful in welding. The beam can be supplied on a microscopic basis to accomplish the welding. To position the beam accurately a display of an image of the weld area using the reflected or back scattered electrons is obtained by a relatively low intensity scanning beam. After the beam is positioned and a deflection line oriented for the desired welding line (for example, by using the line scan techniques of the aforementioned patent application), the beam intensity is increased, and the beam deflected along the required welding line.

Figure 12:
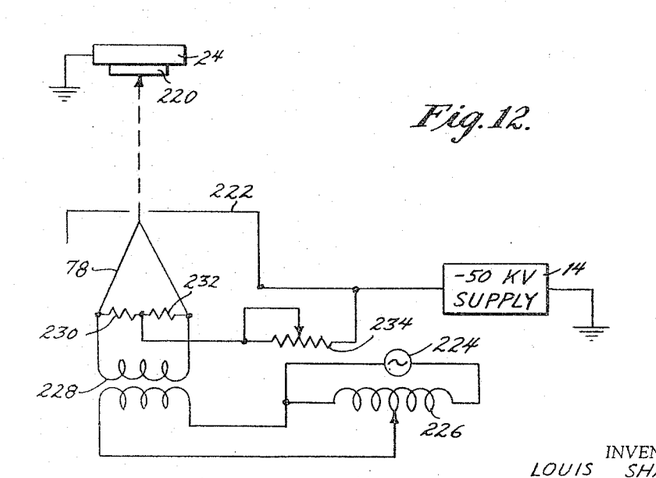
FIG. 12 is a schematic circuit diagram of the beam current circuit.

The variation of the beam intensity in such a welding system may be controlled in the manner illustrated in FIG. 12, which omits the beam-forming system illustrated in FIGS. 2–4 for simplicity of illustration. The stage 24 mounts the specimen parts 220 which are to be welded, and the stage is returned to ground potential. The filament 78 emits electrons through an aperture in the grid structure 222 which may be the same as the grid cap arrangement 80 and 82 described above. The filament 78 is energized from a 115 volt A.-C. source 224 via a variac 226 and 60 cycle transformer 228. The transformer is specially constructed to provide 50 kilovolt insulation between the windings. The adjustment of the variac 226 controls the energization of the filament 78 and, thereby, its temperature. A pair of resistors 230 and 232 are connected across the filament, and to their junction via an adjustable resistor 234, the 50 kv. supply 14 is connected to the grid 222. The resistor 234 operates as a bias resistor to determine the grid cathode biasing voltage, and its adjustment determines the beam current supplied from the filament 78. This mode of operation is known as saturated grid operation.

The temperature control of the variac 226 controls the number of electrons emitted by the filament 78. The setting of a suitable high beam intensity for welding is made by adjustments of the grid bias resistor 234 and the variac 226. A lower value of beam intensity for imaging would likewise be made by these adjustments. The voltage level of the filament 78 and grid 222 is not varied in order that the resulting electron velocity is not varied by these adjustments. With the electron velocity maintained constant, the beam-forming and deflection operations are not affected.

For certain specimens, high velocity electrons may damage the specimen surface during the imaging operation. In that case, low velocity electrons can be provided by adjusting the filament voltage to a low value such as 2–3 kv. This adjustment of voltage is made together with a set of beam former adjustments to change the coil currents to appropriate values to maintain the same beam-forming as well as a scaling of the deflection voltages. Thereby, the beam-forming and beam deflection is maintained when changing from low velocity imaging electrons to high velocity welding electrons. These controls may be manual or may be suitable signal responsive or relay controls (not shown).

The beam-forming and positioning system described is especially adapted for a beam of electrons; however, it is not limited thereto and may be used for beams of charged particles other than electrons, such as an ion beam or a proton beam.

The size of the spot for the various applications of this invention may be adjusted by varying the currents supplied to the beam former coils described above and by varying the grid-filament bias which varies the action of the grid lens. In cutting holes or lines in a specimen or in welding, different size spot diameters may be desired. In a microanalyzer system the smallest obtainable spot may not always be the best one for viewing a particular specimen. A larger spot may be desired where a large area of a specimen is to be scanned with a limited number of scanning lines, and it is desired that the scanning lines be closely spaced or overlapping. The ability to obtain a large scanning spot and the ability to scan a large area makes it possible to scan relatively large features of a specimen. Such large features, which might be lost by a microscopic spot size, can be appropriately examined and the signals obtained for display and recording.

In the microanalyzer system, in order to average the entire surface of a specimen, it may be desirable to use a stationary spot of intermediate diameter, or of diameter which is quite large, say, the size of the overall raster (2 mm. x 2 mm.) or even very much larger, say, about ½″ in diameter. That is, with such a large spot size, stationary radiation of the specimen is provided for getting an average characteristic of the entire specimen. To obtain such a large spot size, the beam formers would be used to enlarge the beam rather than to contract and concentrate it. The effective operation of the beam formers for this purpose may be provided by appropriate adjustment of the energization supplied to the beam former coils. In effect, the beam formers would be expanding the beam size; however, the stringent requirements of collimation might not have to be met. For this purpose, the system of FIG. 2 would be constructed to eilminate aperture stops (such as the stop 118) which are too small in diameter and which would interfere with the expansion of the beam diameter. Averaging with an enlarged stationary spot tends to be non-uniform since the electron distribution in the beam tends to be non-uniform; that is, the concentration decreases radially from the center of the beam. An averaging effect can also be obtained with a smaller spot by scanning over the raster and by an appropriate setting of the rate meters 56 (FIG. 1) to integrate over a number of scanning frames. This approach gives a uniform averaging due to the uniform irradiation over the specimen surface that is scanned. Some of the benefits of uniform averaging may be obtained with a larger spot, say, with a spot large enough to provide overlapping scanning lines. Such a scanning spot may be quite large, say, ¼″ in diameter.

Figures 13, 14:
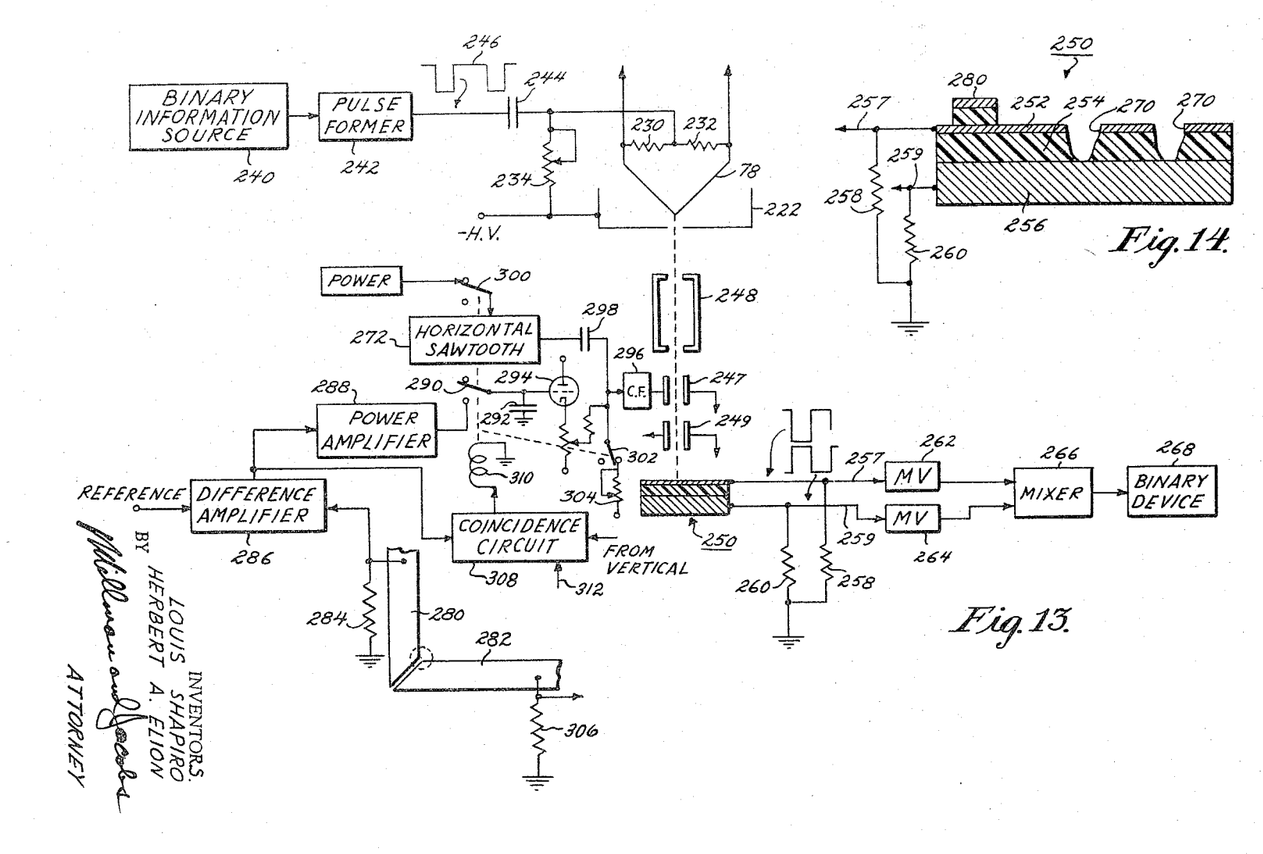
FIG. 13 is a schematic block and circuit diagram of a data storage system embodying this invention.
FIG. 14 is a cross sectional diagram of an information storage medium together with electrical circuit connections thereto for use in the system of FIG. 13.

This invention also has application for use in information storage. A binary information storage system incorporating this invention is shown in FIGS. 13 and 14. Parts corresponding to those previously described are referenced by the same numerals. Binary information signals from a source 240 may take various known forms, and they are supplied to a pulse former 242, the output signals of which are in the form of a pulse and the absence of a pulse representing the binary digits 1 and 0, respectively. The pulses from the pulse former 242 are supplied via a capacitor 244 to the junction of the filament resistors 230 and 232 to vary the grid-bias voltage between the grid cap 222 and the filament 78. The beam former 248 and the horizontal and vertical deflection plates 247 and 249 may be generally similar to the beam-forming and positioning system of FIG. 2 described above. The beam current supplied from the filament 78 may be considered to be a low value in the absence of a pulse 246 and a high value upon application of such a pulse 246. In writing information in a storage medium 250, the high and low currents respectively represent the binary digits, and in reading information, only the low-valued current is used as described hereinafter.

The information storage medium 250 is shown enlarged in greater detail in FIG. 14. This medium 250 includes a thin metal plate 252, a thin insulating plate 254, and a relatively thick conducting plate 256. The thin plate 252 may be of the order of 25–50 angstrom units of evaporated metal which would be thin enough for a high intensity electron beam to cut a hole therethrough, but thick enough so that the low intensity beam would have substantially no effect. The insulating layer 254 may be of a suitable plastic material which would be readily passed by the electron beam. The conductive layer 256 is thick enough so that any cutting effect of the electron beam is negligible.

Separate output electrical connections 257 and 259 are made from the conductive layers 252 and 256 to load resistors 258 and 260, respectively, the other ends of which are returned to a reference potential shown as ground. As shown in FIG. 13, the loads from the conductive layers 252 and 256 are respectively connected to pulse former multivibrators 262 and 264, respectively, the outputs of which are supplied to a mixer 266 which feeds a binary device 268.

In operation, the low intensity beam supplied by the filament 78 is formed and positioned by the beam former 248 and deflection plates 247 and 249; but it does not affect the conductive metal layer 252 because the electrons impinged thereon are readily conducted away. The high intensity beam produced by the pulses 246 is similarly formed and positioned; however, it punctures the layer 252 and the insulating layer 254 through to the conductive layer 256 through which the electrons are conducted away without effect thereon. The punctures 270 in the layers 252 and 254 represent the storage of binary 1 signals, and the absence of such punctures 270 represent binary 0. The scanning lines are spaced to ensure unpunctured lines and conductive connections to all of the conductive areas.

To read the signals stored in the medium 250, a low intensity beam is supplied from the filament 78 through the beam former 248 and the horizontal and vertical deflection plates 247 and 249. When the low intensity (or reading) beam impinges on the layer 252, a current pulse is developed across the resistor 258. At that time, there are no electrons impinging on the lower layer 256, and the voltage developed across its output resistor 260 remains unchanged. These conditions are represented in FIG. 13 by a negative-going pulse at the output connection 257 of the upper layer 252 and the absence of a pulse at the output connection 259 of the lower layer 256. When the reading beam is deflected to pass through a puncture 270, the beam impinges on the lower layer 256 to produce a substantial negative-going pulse across the output resistor 260. At that time, the voltage across the upper layer output resistor 258 remains relatively unchanged, although the outer fringes of the beam may impinge on the portions of the layer 252 surrounding the puncture 270 to produce some noise current in its output resistor 258. The multivibrators 262 and 264 are used as pulse formers, and the multivibrator 264 for the pulse derived from the lower layer 252 is also used to invert the pulse. Thereby, the output pulses from multivibrator 264 are selected as positive-going, representing binary 1 read-out signals, and the outputs from multivibrator 262 are selected as negative-going, representing binary 0 read-out signals. These signals are supplied to a mixer 266 to generate a single train of positive-going and negative-going pulses representing binary 1 and 0, respectively. These binary signals may be selectively supplied to any suitable device 268 such as a digital computer or data processor for their utilization. The device 268 may operate with signals of the same form as those supplied from the source 240.

A sawtooth generator of the type described in the aforementioned application may be used for the horizontal generator 272 which drives the horizontal deflection plates 247. The vertical deflection plates 249 may be driven by a vertical sawtooth generator (not shown) of the type described in the aforementioned copending application. With this arrangement, a scanning raster is developed across the outer surface of the layer 252 of the storage medium 250 to write and record a train of binary signals that are supplied from the source 240 at the same time to control the beam intensity. Thereby, punctures 270 and the absence thereof provide a permanent record of the binary signals supplied from the source 240. For reading back the information stored in the medium 250, the beam is deflected over its raster in a similar fashion with only the low intensity beam supplied from the filament 78, and signals are derived from the output resistors 258 and 260, representing the information stored in the medium 250. The recording process can be monitored by examining the signals developed during writing at the connections 257 and 259 to compare them with the signals from the source 240.

An arrangement for the purpose of positioning the beam at the beginning of its raster with a reasonable accuracy includes two conductive strips 280 and 282 positioned at right angles to each other in one corner of the surface of the top layer 252 on the recording medium 250. The strips 280 and 282 are also generally at right angles, respectively, to the horizontal and vertical deflections of the scanning raster. The strips 280 and 282 are very wide compared to the diameter of the beam and tapered at their adjacent edges and spaced to form a passageway much narrower than the beam diameter.

The strip 280 is insulated from the conductive layer 252 and electrically connected to an output resistor 284 returned to a reference potential and also to one input of a difference amplifier 286, the other input of which receives an adjustable reference voltage. The output of the difference amplifier is also supplied to a power amplifier 288 which may include a circuit, such as a cathode follower that is effective to charge and discharge a capacitor 292 through the switch 290, when actuated. The voltage across the capacitor 292 is supplied via cathode followers 294 and 296 to drive the horizontal deflection plates 247. The sawtooth deflection waveform from the generator 272 is also supplied to the driver circuit 296 via a capacitor 298 for driving the deflection plates 247. A switch 300 supplies power to the generator 272, and a switch 302 connects a level-setting resistor circuit 304 to the input of the cathode follower 296.

The other conductive strip 282 is similarly insulated from layer 252 and connected to an output resistor 306 and to a difference amplifier and power amplifier (not shown) which are connected with the vertical sawtooth generator through similar switches (not shown). The vertical sawtooth waveform similarly is used to drive the vertical deflection plates 249.

The difference amplifier 286 in the horizontal circuit has its output also connected as an input to a coincidence circuit 308 which also receives the output signal from the corresponding difference amplifier output of the vertical circuit. The output of the coincidence circuit 308 energizes a relay coil 310 for the switch 290.

The relay coil 310 is normally de-energized; the coil 310 is in a suitable latching circuit (such as in the anode circuit of one side of a bistable multivibrator also provided in the coincidence circuit 308) that is set by a control pulse on the line 312 and reset by coincidence detected in the remainder of the coincidence circuit 308. With the relay coil 310 de-energized, the switch 290 disconnects the output of the power amplifier 288 from the deflection plates 247. The horizontal sawtooth waveform from the generator 272 is then used for driving the horizontal deflection plates via the cathode follower 296. A similar arrangement (not shown) is used for driving the vertical deflection plates 249.

Upon the receipt of a control pulse on line 312 for initiating a scanning raster, the coil 310 is energized to connect the power amplifier 288 through the switch 290 to discharge the capacitor 292. The resulting drive on the horizontal deflection plates 247 via the cathode followers 294 and 296 deflects the beam to the left towards the conductive strip 280. Until the beam impinges upon that strip 280, the voltage across the output resistor 284 is such as to produce a large positive output from the difference amplifier 286, which output produces a substantial capacitor discharge and driving of the plates 247 to position the beam to the left. If the entire beam spot were to impinge on the strip 280, a large negative voltage across the output resistor 284 would be developed to balance the reference voltage in the difference amplifier 286 so as to produce a large negative output. Thereby, the power amplifier would charge the capacitor to reverse the direction of the drive on the deflection plates 247.

A balanced condition in this effective feedback circuit is determined by the setting of the reference voltage supplied to the difference amplifier 286; for example, that voltage may correspond to the voltage developed across the load 284 when a specified fraction, say less than half, of the beam is positioned on the strip 280. The polarity of the error signal output of the difference amplifier depends on whether more or less than the specified fraction of the beam is striking the strip 280. The deflection plates 247 are then driven accordingly by the polarized error signal until equilibrium is reached with the proper beam fraction on that strip 280. Any tendency of the beam to leave the edge of the strip 280, once positioned there, is prevented by the feedback loop through the difference amplifier to the deflection plates 247.

Any chance deflection of the beam across the strip and to the left thereof is prevented by making it sufficiently wide so that the feedback action is effective before the beam can travel across. Thus, if a noise spike should deflect the beam too far to the left, it lands completely on the conducting strip 280, and the resulting error voltage would cause the beam to be deflected back to the inside edge of that strip 280.

In a similar fashion, the feedback circuit for the vertical deflection plates 249 operates with the conductive strip 282, and the spot is likewise deflected down and positioned along the inside edge of that strip 282. When the beam spot is positioned in the spaced intersection of the strips 280 and 282, the outputs of the difference amplifier 286 and the corresponding amplifier from the vertical circuit are both at substantially low values. This coincidence of low voltages is detected by the coincidence circuit 308 which then operates to reset the coil latching circuit and de-energize the relay coil 310. Thus, it is only when the spot is positioned at that intersection, does it lie on both strips 280 and 282. The narrow space or passageway between the tapered edges of the strips 280 and 282 is very much less than the beam diameter. Thus, if the beam were to travel down that passageway, the difference amplifiers of both the vertical and horizontal circuits would produce the feedback restoring action. Thereby, that spot is positioned accurately at a repeatable starting point for the scanning deflection of the beam spot over a raster.

While the relay 310 is energized, switch 300 is open to de-energize the generator 272, and the switch 302 is open to disconnect the resistor 304. The de-energization of the relay coil 310 opens the switch 290 to trap a voltage on the capacitor 292 that corresponds to a beam deflection along the inside edge of strip 280. Similarly, in the vertical circuit a clamping voltage is developed corresponding to the starting point. The switch 300 connects power to the horizontal sawtooth generator 272, and switch 302 connects resistor 304 to provide an adjustable direct voltage level setting at the input to cathode follower 296. The insertion of resistor 304 modifies the effect of the clamping voltage of capacitor 292 to remove the beam from the margin of the strip 280 to a desired locus in the scanning area. The sawtooth waveform developed by the source 272 superimposes upon this deflection voltage established by capacitor 292 and resistor 304 to develop the horizontal scanning waveform starting with a deflection voltage corresponding to a position just inside of strip 280. The vertical sawtooth waveform is developed and combined with an initial-position voltage and applied to plates 249 in a similar fashion.

Once the relay coil 310 is de-energized, it is so latched, and the beam spot leaves the strip 280 to complete the scanning raster. The coincidence circuit 308 and feedback loop remain ineffective until another control pulse is supplied thereto via line 312 to energize the coil 310.

Other arrangements may be provided for storage of digital information. For example, the medium may be a thin plastic layer about 0.1 micron thick. The layer is burned, pyrolized, or distorted by the heat created due to the high current of the small diameter writing electron beam and the poor thermal diffusivity (defined as the ratio of the conductivity to the product of density and specific heat) of the plastic layer. This plastic layer, after the recording process, has deposited thereon a thin film of conducting material. The information on the layer may be in binary form as described above in the form of a deep burning or distortion with a high current beam and a relatively shallow or negligible distortion with a low current beam respectively representing the binary digits 1 and 0. The conducting film deposited over the distorted plastic surface conforms topographically to the distortions. A reading current beam applied to the conducting layer produces a specimen current in the conducting layer which may be derived by means of a load resistor such as is described above (and as described in the aforementioned copending application). This specimen current is proportional to the back scattered electrons (as described in that copending application), some of which are scattered due to the fact that the surface conductive layer contains a topography conforming to the recorded information burned into the plastic layer. The conductive layer, added after the information is recorded by the writing beam, helps to prevent a buildup of localized charge due to the reading beam. During reading, the read-out signals take different forms corresponding to the information written into the plastic layer by the different values of the writing beam. The derived electrical signals may be amplified and displayed on a cathode ray tube or supplied to any other suitable device.

Another possible storage medium would be a very thin layer of conductive material which is less than 50 angstrom units in thickness which is laid down on a nonconductor, which is also a poor heat conductor or material of poor thermal diffusivity such as glass or quartz. The conductive layer melts or distorts under an intense writing beam in view of the poor heat dissipation of the ultra-thin film. Thereby, a series of punctures and the absence of punctures in the conductive layer are set down, such as described above with respect to FIG. 14. With an output impedance circuit connected to the conductive layer, a reading beam is applied in a manner similar to that described above to derive pulses and the absence of pulses in the output circuit, respectively, in accordance with the absence of punctures and the presence of punctures in the successive locations of the conductive layer.

The electron beam, when applied to certain plastics, pyrolizes these plastics into semi-conductors. Effectively, the beam may be used in the manufacture of semi-conductors by selective pyrolization, for example, with high and low intensity electron beams. This pyrolization is on a molecule by molecule basis to produce semi-conductors of different properties with different intensity beams and with the same property for any given beam intensity. The properties which have been effectively varied by pyrolization are those of ohmic resistance or conductivity and thermoelectric power. A layer of plastic, such as one of the cured epoxy type, deposited on a conductive layer is pyrolized for use as a storage medium by applying thereto a writing beam of different intensities. As indicated, this might be a beam of binary character for the storage of binary information, or more than two different intensities of the beam may be used to write with a corresponding number of states of information storage. The higher the beam energy, the lower the resistance of the resulting semi-conductor element. After the recording pyrolizing process, a conductive layer is set down over the semi-conductor plastic, e.g. by evaporating a thin metallic film on the upper surface and resting the plastic on a relatively thick metal base. A reading electron beam of low intensity is then applied to the conductive layer over a scanning raster as described above. The current passed between the separated conductive metal layers or electrodes (which may receive a voltage differential to suitably bias the semi-conductive layer therebetween) depends upon the impedance developed in the particular point of that semi-conductive layer by the pyrolization of the writing beam when deflected to the same point. Thus, as the beam scans the surface of the upper conductive layer, the currents passed between the electrodes are directly related to the original information signals controlling the writing beam intensity. These currents may be detected by a suitable load impedance in the circuit of the conductive layers for deriving corresponding output signals.

As is well known in the art, most commercially available epoxy resins are based on the condensation of epichlorohydrin with a polyhydric phenol in the presence of alkali; by varying the proportions of the epichlorohydrin and the phenolic component, resins of various molecular weights and reactive functionalities are obtained. All these resins are readily cured by organic bases such as amines to give high molecular weight crosslinked essentially infusible products. These amine-cured compositions will degrade at elevated temperatures generally with an increase in conductivity because of the release of polar fragments, particularly those derived from the amine curing agent. The epoxy resins may also be cured by anhydrides and other acidic curing agents. These generally have better high temperature properties and would be less likely to show the increase in conductivity on being heated although some changes can be expected. Generally, the amine cures are used at room temperature while the anhydrous cures require high temperature conversions.

Another semi-conductor property that may be used is that of thermoelectric generation with heating, which in this system would be supplied by the electron beam. One type of plastic would be a high polymer of the condensed phenolphthalein type. Such polymers have been formed by polymerizing phthalic anhydride and phenols in the presence of zinc chloride to form phenolphthalein. When polymers of the phenolphthalein type are pyrolized, a semi-conductor is formed having a thermoelectric characteristic. The recording process is performed by applying to the plastic a writing beam of different intensities as it is deflected over a raster. The beam heats and pyrolizes the polymer to produce different thermoelectric properties or efficiencies in the semi-conductor in accordance with the different temperatures.

With electrodes applied in the form of a thin film of metal evaporated on top of this semi-conductor, and the semi-conductor layer resting on a thick metal base, the heating effect of a scanning electron beam used for reading causes a voltage to be generated between the metal films in proportion to the heating effect on the plastic at the point on which the beam impinges. The voltage generated would then be proportional to the thermoelectric power of the semi-conductor which, in turn, represents the information stored by the writing beam. The heating power of the beam, both in writing and in reading, can also be varied by the pulse duration of the beam. This would provide not only a binary system but a gray scale of many values as well by virtue of the values of the variable voltage generated during reading. The reading beam intensity is kept to a sufficiently low heating value to prevent any further change in semi-conductor properties.

The capabilities of information storage in the above-described system are very large; that is, with a small spot diameter of the order of a micron or less applied to the scanning raster of 2 mm. x 2 mm. described above, several million discrete storage elements are available. If the spot size is reduced to a small fraction of a micron and the deflection ranges increased by the order of 5 or 10, the number of storage elements is increased by many orders of magnitude. Since there is no inherent limitation in the beam-forming and scanning system of this invention, as far as the beam diameter is concerned, at least down to the neighborhood of 50 angstrom units, and to the size of a scanning raster, at least to the extent noted, it is seen that extremely large storage capabilities are available.

This electronically positioned storage system is augmented by the mechanically positioned stage so that successive storage areas corresponding to a scanning raster may be selectively positioned within the deflection range of the electron beam. There is no limit to the size of the storage made available by using large sheets or reels of recording medium of the type described above in which the stage is used to mechanically position selected portions thereof.

The beam-forming and positioning apparatus described above provides an improved construction for providing a beam of charged particles of extremely small cross section that is readily deflected without seriously impairing the size or shape thereof. This apparatus may be used for various applications and is especially useful as an electron probe in a microanalyzer system and in a data storage system.

We claim:

1. An information storage system comprising means for supplying a beam of charged particles and of different intensities along an axis, a beam-forming system effective along said axis, means for deflecting the formed beam transversely to said axis, means for supplying information signals to different values to said beam-supplying means so that respectively different beam intensities are supplied, an information storage medium for receiving said beam and for storing information in accordance with the diffeernt intensities thereof, and means for supplying deflection signals to said deflecting means to position said beam at different locations of said storage medium including means responsive to the impingement of the beam at said storage medium for controlling the supply of said deflection signals.

2. A beam-forming and deflecting system comprising means for supporting an element having a target area to be irradiated, means for supplying a beam of charged particles along an axis transverse to a supported target element to stimulate the emission of particles therefrom, beam-forming means for concentrating and collimating said beam in a decreased diameter substantially as a cylinder of particles parallel to said axis, and means spaced axially between the end of the beam-forming means and the specimen supporting means for deflecting the cylindrical beam to different portions of an area of said target element, and particle detecting means positioned to receive particles emitted from said specimen and passing through the space between said deflecting means and the supported specimen and transversely to said beam axis.

3. A beam-forming and deflecting system comprising means for supporting an element having a target area to be irradiated, means for supplying a beam of charged particles along an axis tranverse to a supported target element, beam-forming means for concentrating and collimating said beam in a decreased diameter substantially as a cylinder of particles parallel to said axis, and means spaced axially between the end of the beam-forming means and the specimen supporting means for deflecting the cylindrical beam to different portions of an area of said target element, said deflecting means being spaced the order of inches from said target element and producing a beam deflection over said target area of a small fraction of an inch so that the angle of deflection of said beam over said area is of the order of one degree whereby there is substantially no distortion of said cylindrical beam as it is deflected over said area.

4. A beam-forming and deflecting system comprising means for supporting an element having a target area to be irradiated, means for supplying a beam of charged particles along an axis transverse to a supported target element to stimulate the emission of particles therefrom, beam-forming means for concentrating and collimating said beam in a decreased diameter substantially as a cylinder of particles parallel to said axis, means spaced axially between the end of the beam-forming means and the specimen supporting means for deflecting the cylindrical beam to different portions of an area of said target element, and particle detecting means positioned to receive particles emitted from said specimen and passing through the space between said deflecting means and the supported specimen and transversely to said beam axis, said deflecting means being spaced the order of inches from said target element and producing a beam deflection over said target area of a small fraction of an inch so that the angle of deflection of said beam over said area is of the order of one degree whereby there is substantially no distortion of said cylindrical beam as it is deflected over said area.

5. A beam-forming and deflecting system as recited in claim 4 wherein said beam-forming means concentrates the diameter of said beam to the order of a micron or less.

6. A beam-forming and positioning system comprising means for supporting an element having a target area to be irradiated, means for forming a beam of charged particles including a plurality of beam-bending devices, each individually including means for concentrating said beam, for decreasing the beam diameter and for directing the beam substantially parallel to an axis, said devices being positioned in succession along said axis to form and concentrate said beam and to decrease the diameter thereof cumulatively and successively, and means for deflecting the formed substantially parallel beam including a deflection device positioned along said axis to deflect the substantially parallel beam over said target area after being formed by said bending devices, and means for selectively controlling said deflection device.

7. A beam-forming and positioning system as recited in claim 6, wherein the cumulative actions of said means of said beam-bending devices produce an afocal beam of the order of a micron or less in diameter.

8. A beam-forming and positioning system as recited in claim 6, and further comprising means for deriving signals representative of the portion of said target area irradiated by the deflected beam.

9. A scanning imaging system as recited in claim 8 and further comprising a display device having deflection means operated in synchronism with said beam deflection means and having means for producing a display in accordance with said target representative signals.

10. An information storage system comprising means for supplying a beam of particles along an axis, means for deflecting the beam transversely to said axis, means for supplying information signals of different values to said beam-supplying means to control the beam intensity accordingly, an information storage medium having a physical characteristic that is changed permanently in response to a certain beam intensity for storing information thereby and positioned to receive said beam, and means for supplying deflection signals to said deflecting means to position said beam at different locations of said storage medium, including means for detecting the position of impingement of said beam at said storage medium and for deriving signals in accordance with the beam position, and means for controlling the supply of deflection signals in response to the beam position signals.

11. An information storage system as recited in claim 10 and further comprising means for deriving information signals of different values from said storage medium.

12. An information storage system as recited in claim 10 wherein said storage medium includes a layer of material that is cut by said beam of a certain intensity.

13. An information storage system comprising means for supplying a beam of charged particles and of different intensities along an axis, an afocal-beam forming system including means effective along said axis for producing an afocal beam, said producing means including means for concentrating said beam and decreasing the diameter thereof and for rendering it substantially parallel to said axis, means for deflecting the formed afocal beam transversely to said axis, means for supplying information signals of different values to said beam-supplying means so that respectively different beam intensities are supplied, an information storage medium for receiving said afocal beam and for storing information in accordance with the different intensities thereof, means for supplying deflection signals to said deflecting means to position said beam at different locations of said storage medium.

14. An information storage system as recited in claim 13 and further comprising means for deriving information signals of different values from said storage medium, said signal deriving means including means for controlling said electron beam to be of uniform intensity for application to said storage medium to derive said information signals.

15. An information storage system as recited in claim 13 wherein said information storage medium includes a thin layer of material that is cut by said afocal beam of one of said intensities and substantially uncut by said afocal beam of another of said intensities.

16. An information storage system as recited in claim 13 wherein said afocal-beam forming system forms an layers of conductive and insulating material, and means connected to said conductive material for deriving electrical signals therefrom.

17. An information storage system as recited in claim 13 wherein said afocal beam forming system forms an afocal beam of the order of a micron or less.

References Cited by the Examiner

UNITED STATES PATENTS 3,170,083  2/1965  Newberry __________ 315—12 X

OTHER REFERENCES

Zworykin et al.: "A Scanning Electron Microscope," ASTM Bulletin, page 16, August 1942.

DAVID G. REDINBAUGH, *Primary Examiner.*

J. E. BECK, T. A. GALLAGHER, *Assistant Examiners.*